United States Patent
Uchiyama et al.

[11] Patent Number: 6,051,299
[45] Date of Patent: Apr. 18, 2000

[54] MAGNETIC RECORDING MEDIUM, MAGNETIC RECORDING/REPRODUCING APPARATUS AND METHOD FOR MANUFACTURING METALLIC MOLD FOR MOLDING DISC

[75] Inventors: Hiroshi Uchiyama; Nobuhiro Nagano, both of Miyagi, Japan

[73] Assignee: Sony Corporation, Tokyo, Japan

[21] Appl. No.: 08/980,964

[22] Filed: Dec. 1, 1997

[30] Foreign Application Priority Data

Dec. 2, 1996 [JP] Japan .................................. 8-321992

[51] Int. Cl.$^7$ ...................................... G11B 5/00
[52] U.S. Cl. .............. 428/65.3; 428/694 T; 428/694 TR; 428/694 SG; 428/900; 428/141; 369/272; 369/277; 369/283; 369/286; 204/192.2; 204/192.34; 204/192.35
[58] Field of Search ................ 428/65.3, 694 T, 428/694 TR, 694 SG, 141, 900; 369/272, 277, 283, 286; 204/192.2, 192.34, 192.35

[56] References Cited

U.S. PATENT DOCUMENTS

| 5,134,601 | 7/1992 | Greenwell | 369/44.26 |
| 5,414,652 | 5/1995 | Mieda et al. | 365/122 |

FOREIGN PATENT DOCUMENTS

| 414516A2 | 8/1990 | European Pat. Off. |
| 673025A1 | 2/1995 | European Pat. Off. |

*Primary Examiner*—Leszek Kiliman
*Attorney, Agent, or Firm*—Ronald P. Kananen; Rader, Fishman & Grauer

[57] ABSTRACT

A magnetic recording medium having pits corresponding to servo signals and grooves extending along recording tracks, in which a magnetic head undergoes only little variations in its floating amount during recording/reproduction. The ratio Lw/Gw, where Lw is the width of a land 4 as a protuberant portion between neighboring grooves 3 and Gw is the width of the groove 3, is set so as to be not less than 2.0.

8 Claims, 7 Drawing Sheets

3 : GROOVE
4 : LAND

MAGNETIC RECORDING MEDIUM, MAGNETIC RECORDING/REPRODUCING APPARATUS AND METHOD FOR MANUFACTURING METALLIC MOLD FOR MOLDING DISC

BACKGROUND OF THE INVENTION

1. Field of the Invention

This invention relates to a magnetic recording medium formed with a groove as a tracking controlling guide groove, and to a magnetic recording/reproducing apparatus for recording/reproducing the magnetic recording medium. The present invention also relates to a method for manufacturing a metallic mold for molding a disc as a master for a substrate of a magnetic recording medium.

2. Description of Related Art

In the field of a magnetic recording medium, development of such magnetic recording medium having pits corresponding to servo signals is proceeding for realization of a higher recording density. The pits corresponding to servo signals means crests and recesses pre-formed on the substrate of the magnetic recording medium during molding thereof in association with the servo signals.

In the magnetic recording medium having these pits formed therein, the crests and recesses are magnetized to opposite polarities before using the recording medium for recording/reproduction for writing the servo signals. Since these pits can be formed to extremely high accuracy, it becomes possible to write the servo signals highly accurately by pre-forming pits corresponding to the servo signals on the substrate. That is, servo signals can be written at extremely correct positions on the recording tracks thus enabling high-density recording more easily than with a conventional magnetic recording medium. In the following description, a zone in which to write these servo signals is termed a servo zone.

In the magnetic recording medium having these pits formed therein, there are usually formed a plurality of grooves for extending along recording tracks. The groove herein means a groove-shaped recessed portion formed along the recording track and is formed in a zone other than the servo zone. That is, the groove is formed in an area of the recording track in which data is recorded or reproduced by the user. The projecting portion defined between the grooves is termed a land on which the major portion of data recorded or reproduced by the user is recorded. In the following description, an area in which the above groove is formed and which is used for data recording/reproduction by the user is termed a data zone.

For data recording/reproduction on or from a magnetic recording medium using a magnetic head, a magnetic head is arranged on a magnetic recording medium which is rotated at a high velocity. The magnetic head at this time is floated under the effect of an airstream generated by such rotation. For stabilized recording/reproduction on or from the magnetic recording medium, the amount of this float is preferably kept constant.

However, with the magnetic recording medium having the pits or the groove formed therein as described above, it is difficult to keep the amount of float of the magnetic head constant because of irregular formations on the medium surface. In particular, in a magnetic recording medium having a servo zone and a data zone, since the proportion of the crests and recesses in the servo zone formed with the pits differs from that of the lands and the recessed portions in the data zone formed with the grooves, the amount of float of the magnetic head over the servo zone differs from that over the data zone.

It is noted that the height of a pit is equal to or higher than the height of the texture formed on a recording medium in a conventional hard disc device. Also, the length of the pit is of the order of several micrometers which is equivalent to that of the texture. Thus, the magnetic recording medium in which the proportion of the crests and recesses in the servo zone formed with the pits differs from that of the lands and the recessed portions in the data zone formed with the groove has a non-uniform texture state.

The result is that the amount of float of the magnetic head over the servo zone differs from that over the data zone, thus producing variations in the amount of float of the magnetic head during recording/reproduction to render it difficult to perform stabilized recording/reproduction. This problem is inherent in a magnetic recording medium having pre-formed pits, while it cannot occur in a magnetic recording medium having an overall planar surface. Specifically, with a magnetic recording medium having preformed pits or grooves, it is imperative to suppress fluctuations in the amount of float of the magnetic head.

In a magnetic head in which the data zone is formed with the groove and thus presents an irregular surface, the amount of float of the magnetic head is varied under the effect of the crests and recesses, thus considerably varying off-track characteristics. From this it may be easily surmised that, in the grooved portion representing recessed portions, the separation from the magnetic head is increased to lower the output. Therefore, in a magnetic head in which the data zone presents an irregular surface due to the grooves, it is necessary to prevent the off-track margin from being lowered under the effect of the groove.

SUMMARY OF THE INVENTION

It is therefore an object of the present invention to provide a magnetic recording medium having pits corresponding to servo signals and a groove along a recording track, in which variations in the amount of float of the magnetic head during recording/reproduction may be suppressed and which has superior off-track characteristics.

It is another object of the present invention to provide a magnetic recording/reproducing apparatus suitable for recording/reproducing on or from the magnetic recording medium.

It is yet another object of the present invention to provide a method for manufacturing a metallic mold for molding a disc suitable for manufacturing the magnetic recording medium.

In recording/reproducing data on or from a magnetic recording medium by a floating magnetic head, the relation between the recording/reproducing characteristics and the amount of float of the magnetic head can be found by calculations. As described for example in William-Comstock et al., "An Analytical Model of the Write Process in Digital Magnetic Recoding" 17th Ann. Alp Conf. Proc. Part 1, 738–742, 1990, the width of transition of magnetization of a magnetic recording medium can be calculated based on the spacing during recording data on a magnetic recording medium by a floating magnetic head, that is the separation between the magnetic head and the magnetic recording medium, for estimating an output obtained on reproduction of the recorded signal.

That is, by these calculations, the magnitude of the output of the playback signals obtained from an optional portion of the magnetic recording medium can be known, and hence the ratio to the noise signal of the playback signals from a track on which data has been newly recorded can be found. The noise signal herein means signals from a track neighboring to the track on which data has been newly recorded or signals derived from old data remaining on the latter track. By these calculations, the present inventors conducted researches into the relation between the ratio of the playback signals to the nosie and the shape of the pits and grooves in the magnetic recording medium having these pits and grooves.

As a matter of course, an output of the playback signal from the protuberant portions of a magnetic recording medium is maximum, with an output from a step between the protuberant portions and the recessed portions and an output from the recessed portions becoming smaller in this order. In checking into the recording/reproducing characteristics, it is necessary to check not only into the relative magnitudes of these outputs but also to scrutinize whether or not the playback output is a reproducible optimum signal. Thus, the present inventors manufactured plural magnetic recording mediums with different pit or groove shapes and measured the bit error rates thereof for checking into the conditions under which the bit error rate becomes sufficiently small.

As a result of this research, the present inventors have found that, in a magnetic recording medium having pits and grooves, the off-track characteristics depend appreciably on the ratio of the width Lw of the land between neighboring grooves to the width Gw of the groove, such that the off-track characteristics can be improved by optimizing this ratio Lw/Gw.

The present invention, completed on the basis of this finding, resides in a magnetic recording medium having irregular formations corresponding to servo signals and grooves extending along recording tracks, wherein the ratio Lw/Gw, where Lw and Gw denote the width of a land as a protuberant portion between neighboring grooves and the width of the groove, respectively, is not less than 2.0, with the track pitch Tp and the width t of an inclined surface on a boundary between the land and the groove, preferably the following relation:

$$Lw/Gw \leq (\frac{4}{5} \times Tp+t)/(\frac{1}{5} \times Tp-t).$$

Specifically, the above ratio Lw/Gw is not more than 7.26. This limitation of the value of the ratio Lw/Gw is particularly preferred for a magnetic recording medium having the step difference between the groove and the land of not less than 100 nm.

The present invention also provides a magnetic recording/reproducing apparatus having a recording magnetic head for magnetic recording on a magnetic recording medium having grooves formed along recording tracks, wherein the track width T of the recording magnetic head is not less than the width Lw of the land representing a protuberant portion between neighboring grooves and not more than the sum of the track pitch Tp and the groove width Gw.

With the width Lw of the land, width Gw of the groove, track pitch Tp and the servo error margin Em during magnetic recording, the track width T of the recording magnetic head is preferably given by the following relation:

$$Lm+Em \times 2 \leq T \leq Tp+Gw-Em \times 2.$$

The present invention also provides a method for manufacturing a disc-molding metallic mold formed by a substrate and a metallic film formed thereon, including a metallic film forming step of depositing a metallic material on the substrate for forming the metallic film, a cutting step of applying a photoresist on the metallic film formed by the metallic film forming step for exposing to light and developing the photoresist in accordance with a pre-set pattern for forming a resist pattern leaving only a bit-forming portion and/or a groove-forming portion and etching the metallic film by reactive ion etching, using the photoresist left by the cutting step, for forming portions of the metallic film in register with the bit-forming portion and/or the groove-forming portion as protuberant portions to form the disc-forming metal mold.

The present invention thus provides a magnetic recording medium having grooves formed along recording track, in which the magnetic head undergoes only little variation in its floating amount during recording/reproduction and which is superior in off-track characteristics. The present invention also provides a magnetic recording/reproducing apparatus capable of recording/reproducing data on or from such magnetic recording mediums. Since the off-track characteristics are improved, track density can be improved significantly. Moreover, off-track characteristics superior to those obtained with a flat disc surface can be realized with a magnetic disc having pits and grooves previously formed thereon.

DESCRIPTION OF PREFERRED EMBODIMENTS

Referring to the drawings, preferred embodiments of the present invention will be explained in detail. The present invention is however not limited to the following embodiments and may be suitably modified as to the material type or shape without departing from the scope of the invention.

Figure 1:
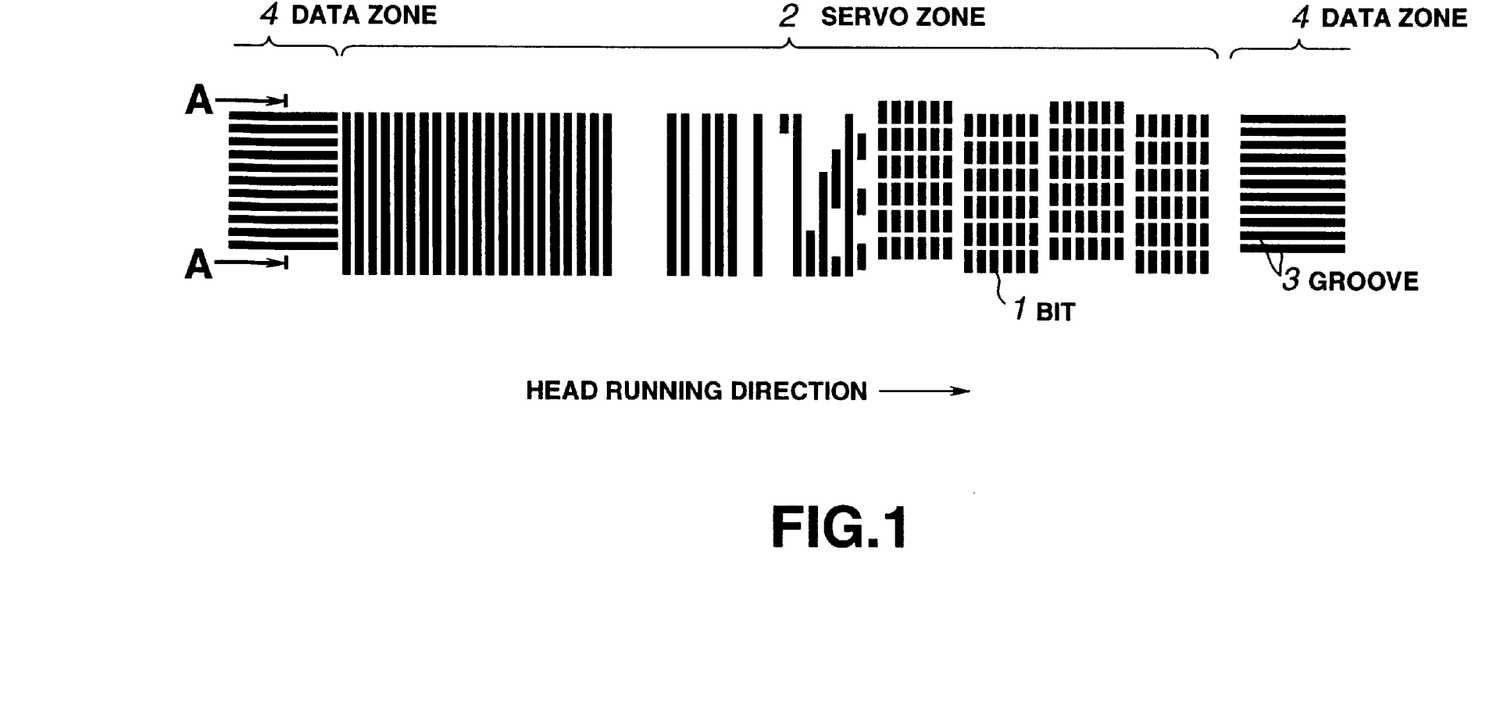
FIG. 1 is a schematic plan view showing irregular formations in the data zone and the servo zone of a magnetic disc embodying the invention.

A magnetic recording medium of the present invention is a magnetic disc comprised of a disc substrate of plastics 2.5 inches in diameter and a magnetic recording layer formed thereon. The magnetic recording medium has a servo zone 2, having pits 1 formed therein in association with the servo signals and a data zone 4 having a groove 3 formed along a recording track. In FIG. 1, black portions indicate crests or lands and other portions indicate recesses or recessed portions.

Prior to recording/reproduction, the magnetic disc is magnetized so that the recesses and crests will be magnetized to opposite polarities. This writes servo signals in the pits 1 formed in the servo zone 2.

Figure 2:
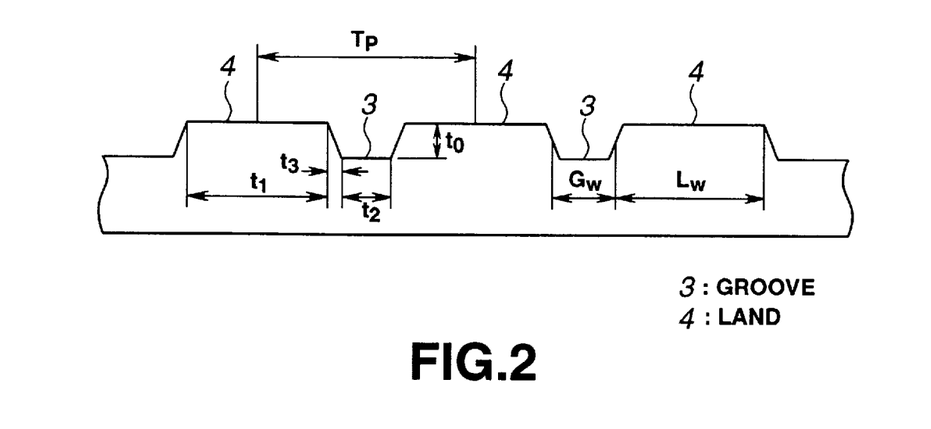
FIG. 2 is a schematic cross-sectional view along line A—A in FIG. 1 showing the irregular formations in the data zone and the servo zone.

Referring to FIG. 2, showing the cross-section taken along line A—A in FIG. 1, there are formed grooves 3 in the data zone 4 of the magnetic disc at a pre-set track pitch Tp. The hill-shaped area between neighboring grooves 3 represents a land 5. The grooves 3 are formed so that the step to between the groove 3 and the land 5 will be not less than 100 nm. In the present magnetic disc, the center of the land 5 corresponds to the track center and data signals are recorded mainly in the lands 5.

With the magnetic disc according to the present invention, the ratio of the width Lw of the land 5 to the width Gw of the groove 3 (Lw/Gw) is set to 2.0 or higher. It is difficult to form the land 5 and the groove 3 to a true rectangular shape such that the boundary between the land 5 and the groove 3 usually presents an inclined surface as shown in FIG. 2. In the following description, the width of the upper surface of the land 5 is denoted as $t_1$, the width of the bottom surface of the groove 3 is denoted as $t_2$ and the width of the inclined surface on the boundary between the land 5 and the groove 3 is denoted as $t_3$. The center of the inclined surface on the boundary between the land 5 and the groove 3 is the boundary between the land 5 and the groove 3. That is, in the present specification, $t_1+t_3$ is termed the width of the land 5 and the width of the land 5 is Lw, while $t_2+t_3$ is termed the width of the groove 3 and the width of the groove 3 is Gw.

For checking into the relation between the ratio of the width Lw of the land 5 to the width Gw of the groove 3 (Lw/Gw) and the off-track characteristics, plural magnetic discs with variable widths Lw of the lands 5 or variable widths Gw of the grooves 3 were produced.

The patterns of the irregular formations (lands or crests and recesses or recessed portions) on the disc substrate were formed by a method similar to the methods usually employed in manufacturing an optical disc. That is, a photoresist is first applied to the surface of a glass substrate used as a reference surface, and a grooved pattern is exposed to light on the photoresist based on cutting data. After exposing the groove pattern to light, the photoresist was developed and a resist pattern corresponding to the grooved pattern was formed. The resist pattern was then plated with Ni and subsequently this Ni plating was peeled off from the resist pattern. The back surface was then ground for trimming to a desired thickness. This completes a metallic mold for disc molding which can be used as a master for the disc substrate. The above-described disc substrate was fabricated by injection molding using this metallic mold for disc molding.

In fabricating this disc substrate, the groove 3 was not formed to the entire surface of the disc substrate but was formed only in an annular portion of the disc substrate between a circle with a radius of 20.0 mm and a circle with a radius of 25.0 mm, with other portions being left flat.

In evaluation of the off-track characteristics, as later explained, the off-track characteristics of the magnetic disc formed with the groove 3 were measured at a point of the radius of 24.0 mm. In the evaluation of the off-track characteristics, as later explained, the off-track characteristics are compared to those of a flat magnetic disc. In this evaluation, the off-track characteristics in the portion other than the above-mentioned annular portion of the magnetic disc were used in substitution for the off-track characteristics of the flat magnetic disc.

On the disc substrate, fabricated as described above, a magnetic recording layer was formed by a sputtering method using argon (Ar) as a sputtering gas. The magnetic recording layer was formed by layering an underlying layer for the magnetic layer, the magnetic layer having an intermediate layer of chromium (Cr) with a film thickness of 0.5 mm, and a protective layer for the magnetic layer, in this order. A lubricating layer was further formed on the magnetic layer to complete the magnetic disc.

Specifically, the underlying layer of Cr was formed to a thickness of 10 nm with a film-forming rate of 20 nm/sec under a sputtering pressure of 0.1 Pa. The magnetic layer of $Co_{64}Pt_{20}Cr_{16}$ was then formed to a thickness of 24 nm with a film-forming rate of 2 nm/sec under a sputtering pressure of 0.1 Pa. The protective layer of carbon (C) was then formed to a thickness of 13 nm with a film-forming rate of 0.5 nm/sec under a sputtering pressure of 0.5 Pa. The lubricating layer of FomblinZ-Dol was then formed to a thickness of approximately 2 nm by the dipping method.

The magnetic properties of the magnetic recording layer of the magnetic disc, manufactured as described above, were measured using a vibration sample type magnetometer (VSM). It was found that the residual magnetization thickness Mr.t=9 mA, coercivity Hc=167 kA/m and the coercivity rectangular ratio S*=0.8.

For checking into characteristics of the above magnetic disc when the width Lw of the land 5 or the width Gw of the groove 3, a magnetic disc with the ratio of the width Lw of the land 5 to the width Gw of the groove 3 (Lw/Gw) set to not less than 2.0 was produced. Also, as a comparative example, a magnetic disc with the ratio of the width Lw of the land 5 to the width Gw of the groove 3 (Lw/Gw) set to less than 2.0 was produced. In the following Examples and Comparative Examples, the numerical values specifying the shape of the groove 3 or the land 5 represent those obtained on actually measuring the shape of the grooves 3 or lands 5 of the completed magnetic discs using an atomic force microscope (AFC).

EXAMPLE 1

In a magnetic disc of the present Example 1, a step difference $t_0$ between the groove 3 and the land 5 was 100 nm, the width $t_1$ of the upper surface of the land 5 was 2.3 μm, the width $t_3$ of the inclined surface on the boundary between the land 5 and the groove 3 was 0.3 μm and the width $t_3$ of the bottom surface of the groove 3 was 0.9 μm. At this time, the width Lw of the land 5 was Lw=$t_1+t_3$=2.6 μm, while the width Gw of the groove 3 was Gw=$t_2+t_3$=1.2 μm, with the ratio therebetween Lw/Gw being 2.17.

EXAMPLE 2

In a magnetic disc of the present Example 1, a step difference $t_0$ between the groove 3 and the land 5 was 100 nm, the width $t_1$ of the upper surface of the land 5 was 2.5 μm, the width $t_3$ of the inclined surface on the boundary between the land 5 and the groove 3 was 0.3 μm and the width $t_3$ of the bottom surface of the groove 3 was 0.7 μm. At this time, the width Lw of the land 5 was Lw=$t_1$+$t_3$=2.8 μm, while the width Gw of the groove 3 was Gw=$t_2$+$t_3$=1.0 μm, with the ratio therebetween Lw/Gw being 2.80.

EXAMPLE 3

In a magnetic disc of the present Example 1, a step difference $t_0$ between the groove 3 and the land 5 was 100 nm, the width $t_1$ of the upper surface of the land 5 was 2.8 μm, the width $t_3$ of the inclined surface on the boundary between the land 5 and the groove 3 was 0.3 μm and the width $t_3$ of the bottom surface of the groove 3 was 0.4 μm. At this time, the width Lw of the land 5 was Lw=$t_1$+$t_3$=3.1 μm, while the width Gw of the groove 3 was Gw=$t_2$+$t_3$=0.7 μm, with the ratio therebetween Lw/Gw being 4.43.

Comparative Example 1

In a magnetic disc of the present Example 1, a step difference $t_0$ between the groove 3 and the land 5 was 100 nm, the width $t_1$ of the upper surface of the land 5 was 2.0 μm, the width $t_3$ of the inclined surface on the boundary between the land 5 and the groove 3 was 0.3 μm and the width $t_3$ of the bottom surface of the groove 3 is 1.2 μm. At this time, the width Lw of the land 5 was Lw=$t_1$+$t_3$=2.3 μm, while the width Gw of the groove 3 was Gw=$t_2$+$t_3$=1.5 μm, with the ratio therebetween Lw/Gw being 1.53.

Evaluation of Off-track Characteristics

For the magnetic discs, manufactured as described above, recording/reproduction was actually carried out for measuring the off-track characteristics thereof.

For recording/reproduction, a compound magnetic head, combined from an inductive type magnetic head operating as a recording magnetic head and a magneto-resistance type magnetic head, operating as a playback magnetic head, was used. The recording head with a track width of 3.8 μm and a magnetic gap separation of 0.5 μm was used as the inductive type magnetic head, while a playback magnetic head with a track width of 3.0 μm and the separation of the magnetic shield holding a magneto-resistance device of 0.36 μm was used as magneto-resistance type magnetic head.

For assuring abutment of the compound magnetic head relative to the magnetic disc, a so-called 50% nano-slider was assembled into the magnetic head. The length and the width of the slider were 2.0 mm and 1.6 mm, respectively. Recording/reproduction was carried out by rotating the magnetic disc at a linear velocity of 7.36 m/sec. The amount of float of the compound magnetic head at this time was approximately 60 nm.

Figure 3:
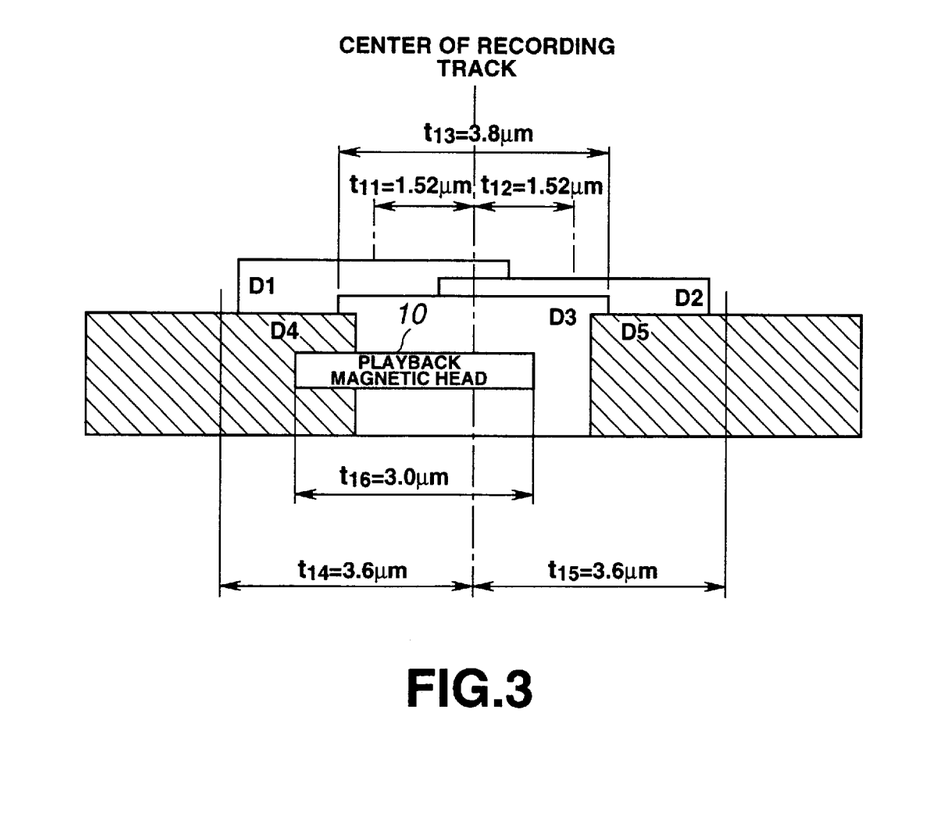
FIG. 3 is a schematic view showing a recording pattern at the time of measuring the bit error rate.

The off-track characteristics were measured by writing data D1 to D5 on the magnetic disc using a recording magnetic head 11 and reproducing the data D3 using the playback magnetic head 10.

First, using a recording magnetic head 11, virtual data D1, D2 were written on two (left and right) tracks, as indicated by $t_{11}$, $t_{12}$ in FIG. 3, deviated 1.5 μm each from a track under consideration in measuring the off-track characteristics, termed herein as a recording track.

Then, data for detection D3 was written on the recording track, using a recording magnetic head 11. The width $t_{13}$ of a portion of the recording track, on which the data was written, (corresponds to the track width T of the recording magnetic head 11, and is equal to 3.8 μm. The data length of the data D3 written in the recording track was 9628 bytes.

The recording magnetic head 11 was then deviated from the center of the recording track a distance equal to 95% of the width of the track pitch Tp and data D4, D5 were overwritten on the neighboring two tracks (left and right tracks). That is, the data D4 and D5 were overwritten on the two left and right tracks, separated 3.8 μm from the center of the recording track, as indicated at $t_{14}$ and $t_{15}$ in FIG. 3, using the recording magnetic head 11.

The data written as described above were repeatedly read out by the playback recording head with a track width $t_{16}$ of 3.0 μm, as the head was deviated little by little from the center of the recording track. The reproduced track and the original recording data were compared to each other for measuring the bit error rate, the reference of which was set to $10^{-7}$. That is, the maximum off-track amount satisfying the bit error rate of $10^{-7}$ was used as the reference for evaluation. In the following description, the maximum off-track amount satisfying the bit error rate of $10^{-7}$ is termed simply as the maximum off-track amount. The maximum off-track amount for the flat disc surface free of the groove 3 was approximately 1.3 μm.

Figure 4:
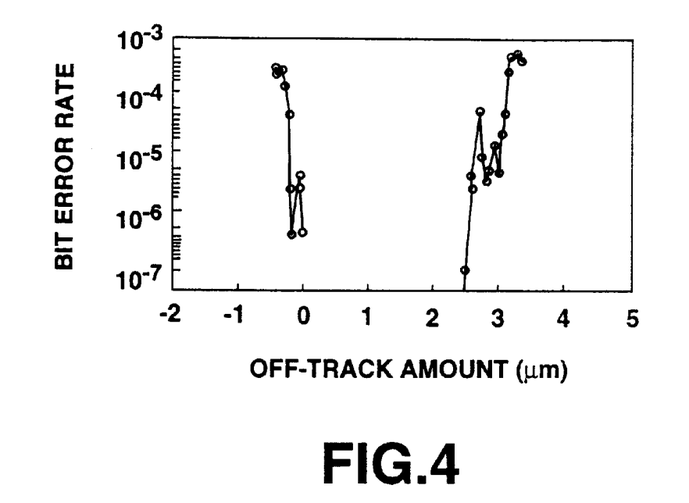
FIG. 4 is a graph showing the results of the measurement of the off-track amount of the playback magnetic head and the bit error rate.

FIG. 4 shows the measured results obtained when the bit error rate was measured for the magnetic disc prepared as a comparative example. In FIG. 4, the abscissa denotes a position corresponding to the maximum off-track amount on deviation of the playback magnetic head 10 towards the left relative to the recording track as being 0.

As may be seen from FIG. 4, the maximum off-track amount of the magnetic disc of the comparative example was approximately 1.28 μm. Thus, with the magnetic disc of the comparative example, there is formed no groove 3 such that the amount of off-track is smaller than that when the disc surface is flat, thus worsening the off-track characteristics.

The amount of off-track was similarly measured with each of the magnetic discs manufactured as Examples 1 to 3. The measured results of these Examples and the comparative example are shown collectively in a graph of FIG. 5.

Figure 5:
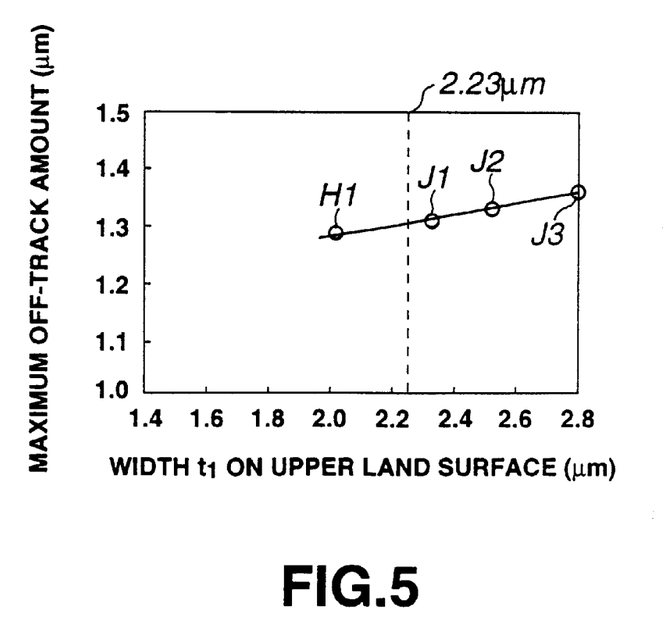
FIG. 5 is a graph showing the relation between the width $t_1$ of the upper land surface and the maximum off-track amount.

In FIG. 5, the abscissa denotes the width $t_1$ of the upper surface of the land 5, while the ordinate denotes the amount of maximum off-track. In FIG. 5, H1, J1, J2 and J3 denote values of the magnetic discs of the comparative examples and the Examples 1 to 3, respectively.

Since the amount of the maximum off-track for the flat disc surface was approximately 1.3 μm, it may be seen from FIG. 5 that the off-track characteristics are improved over those of the flat disc surface when the width $t_1$ of the upper surface of the land 4 $t_1$ is approximately not less than 2.23 μm.

The width $t_1$ of the upper surface of the land 5 of 2.23 μm is equivalent to the width of the land 5 Lw=$t_1$+$t_3$ equal to 2.26 μm and the width of the groove 3 Gw=$t_2$+$t_3$ equal to 1.27 μm, with the ratio therebetween Lw/Gw being 1.99. That is, if this ratio Lw/Gw is not less than approximately 2.0, the amount of maximum off-track becomes larger than if the disc surface is flat, thus improving the off-track characteristics.

Figure 6:
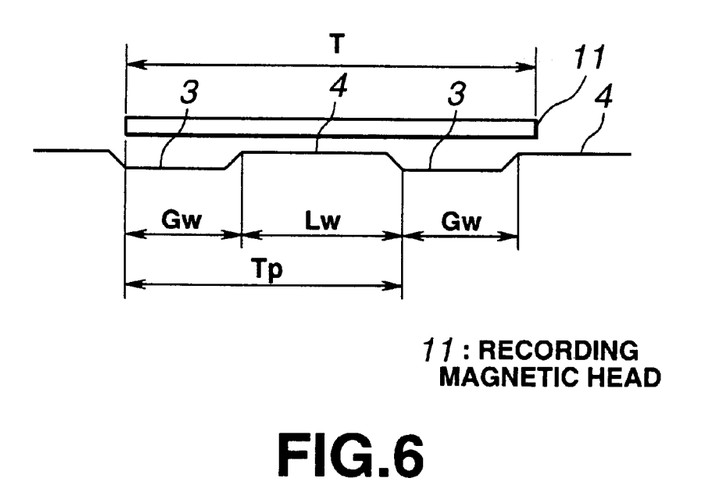
FIG. 6 shows the relation between a recording magnetic head having an excessive track width T and the land/groove.

It is seen from above that the off-track characteristics are improved when the ratio Lw/Gw, with Gw being the width of the groove 3 and with Lw being the width of the land 5, is not less than approximately 2.0. These characteristics are realized only when at least the entire land 5 is covered by the recording magnetic head. In order for the recording magnetic head 11 to necessarily cover the land 5, the track width T of the recording magnetic head needs to be larger than the width Lw of the land 5. Therefore, with the magnetic recording/reproducing apparatus adapted for recording/ reproducing a magnetic head having the groove 3, the track width T of the recording magnetic head 11 needs to be larger than the width Lw of the land 5.

On the other hand, if the track width T of the recording magnetic head 11 is larger than the sum of the width Lw of the land 4, the width Gw of the groove 3 formed on the right side of the land 4 and the width Gw of the groove 3 formed on the left side of the land 4, data is necessarily written in a portion of the land 5 of the neighboring track. It should be noted that the sum of the width Lw of the land 5 and the width Gw of the groove 3 corresponds to the track pitch Tp. Thus, it is also necessary for the track width T of the recording magnetic head 11 be not larger than the sum of the track pitch Tp and the width of the groove 3.

If, in the case of an actual magnetic recording/reproducing apparatus, the track width T of the recording magnetic head is equal to the width t of the upper surface of the land 5, the land 5 cannot be covered immediately on occurrence of a servo error in the recording magnetic head 11 during writing. Thus, for sufficiently covering the land 5, the track width of the recording magnetic head 11 is preferably slightly larger than the width $t_1$ of the upper surface of the land 5 for taking into account the servo error produced during recording. Specifically, an allowance approximately twice the servo error margin for recording is preferably added to the track width T of the recording magnetic head 11.

Thus, with the servo error margin Em for recording, the track width T of the recording magnetic head desirably satisfies the following equation (2-1):

$$t_1 + Em \times 2 \leq T.$$

On the other hand, if the track width T of the recording magnetic head 11 is too broad, it invades into a portion of the land 5. Therefore, the track width T needs to be smaller than the sum of the track pitch Tp and the width Gw of the groove 3. In this case, it is similarly necessary to take the servo error during recording into account. Thus, the track width T of the recording magnetic head desirably satisfies the following equation (2-2):

$$T \leq Tp + Gw - Em \times 2.$$

Thus, from the above equations (2-1) and (2-2), the track width T of the recording magnetic head 11 is desirably set to satisfy the following equation (2-3):

$$Lw + Em \times 2 \leq Tp + Gw - Em \times 2.$$

Meanwhile, in order for the recording magnetic head to be able to cover the land 5 without regard to the servo error, the track width of the recording magnetic head needs to be not less than $(t_1 + Em \times 2)$. In a common magnetic recording/reproducing apparatus, the servo error margin is of the order of $1/10$ of the track pitch Tp or less. Therefore, the track width T of the recording magnetic head 11 needs to be not less than (t1+Tp/5).

Figure 7:
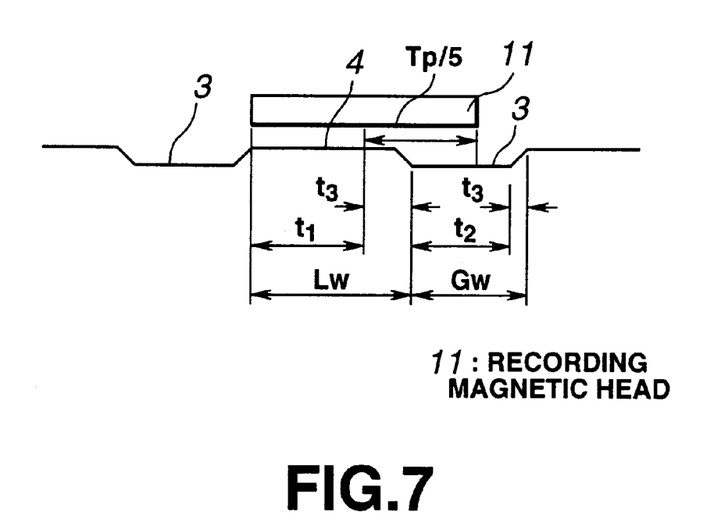
FIG. 7 shows the relation between the recording magnetic head having a track width T equal to $(t_1+Tp/5)$ and the track/land.

Since the recording magnetic head is not allowed to invade into the land 5 of the neighboring track, the following equation (2-4):

$$t_3 + t_2 + t_3 \geq Tp/5,$$

needs to be met with the use of the recording magnetic head 11 with the track width T equal to (t1+Tp/5), as may be seen FIG. 7.

Since the width Lw of the land 5 is given as $(t_1+t_3)$ and the width Gw of the groove 3 is given as $(t_2+t_3)$, it is seen from the above equation (2-4) that the ratio Lw/Gw, with Gw being the width of the groove 3 and with Lw being the width of the land 5, needs to satisfy the following equation (2-5):

$$Lw/Gw \leq (4/5 \times Tp + t_3)/(1/5 \times Tp - t_3).$$

In the above example, since the track pitch Tp=32.8 μm and the width $t_3$ of the inclined surface on the boundary between the land 5 and the groove 3 is such that $t_3$=0.3 μm, it is seen from the above equation (2-5) that the ratio Lw/Gw, with Gw being the width of the groove 3 and with Lw being the width of the land 5, is preferably not more than 7.26.

However, the above equation (2-5) generally holds irrespective of the value of the track pitch Tp. Thus, the present invention is not limited to the above embodiments in which the track pitch Tp is 3.8 μm.

Figure 8:
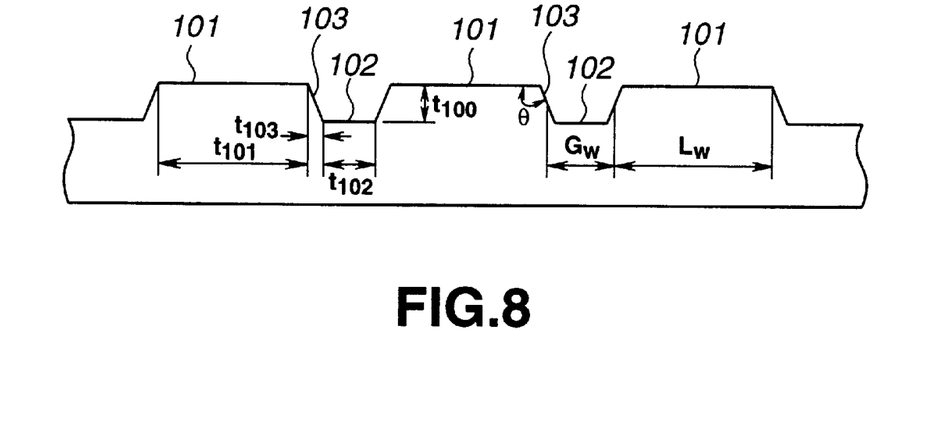
FIG. 8 is a schematic cross-sectional view showing the state of irregular formations of a data zone and a servo zone of an illustrative magnetic disc of the present invention.

The above limitation of the ratio Lw/Gw is particularly suited for a magnetic disc in which the angle θ between the inclined surface 103 on the boundary of the land 101 and the groove 102 and the land 103 is not less than 90° and not more than 105°. If θ is not less than 90° and not more than 105°, there is obtained a magnetic disc having superior off-track characteristics.

Since the substrate of the above magnetic disc is fabricated by an injection molding, θ is not lower than 90°. If θ is not less than 105°, off-track characteristics are lowered.

A substrate of a magnetic disc with θ not less than 90° and not more than 105° is manufactured using a metal mold for disc molding now explained.

The metallic mold for disc molding is made up of a substrate and a metallic film formed thereon. The method for manufacturing the metal mold for disc molding includes a metal film forming step, a cutting step and an etching step.

In the metal film forming step, a metallic material is deposited on a substrate for forming a metallic film which is ground to a mirror surface.

The metallic material is desirably reactive to ion plasma and specifically includes Titanium (Ti).

In the cutting step, a photoresist is coated on the metal film formed by the above metal film forming step and the photoresist is exposed to light and developed in accordance with a pre-set pattern. There is formed a resist pattern leaving a pit forming portion and a groove forming portion in meeting with the pre-set pattern.

In the etching step, the metallic film is etched by reactive ion etching (RIE) using the photoresist left in the cutting step as a mask. Only the pit forming portion and the groove forming portion of the photoresist of the metal film is formed as convex portions for forming a metallic mold for disc molding.

The RIE is chemical etching which performs etching by a chemical reaction with the metal of the metallic film by exploiting a reactive gas plasma such as $BCl_3$.

Ti can be etched by chemical reaction with a gas such as $BCl_3$. If absolute time information film is formed on a substrate, as in the present invention, lands or recesses can be formed more sharply with RIE than with the conventional physical etching in which ions are bombarded on the metallic film for groove cutting.

The metallic mold for disc molding was prepared by the above method. Using this metallic mold for disc molding, a disc substrate was prepared by injection molding and a magnetic recording film was formed on the disc substrate for producing a magnetic disc.

EXAMPLE 4

A Ti film was first and formed on a substrate by a sputtering method employing Ar as a sputtering gas.

Specifically, the vacuum, sputtering pressure, power and the film forming speed were set to $5 \times 10^{-5}$ Pa, 0.2 Pa, 800 W and 10 µm/3000 s, respectively.

A photoresist was then coated on the Ti film and ground to a mirror surface.

The photoresist was exposed to light and developed for forming a resist pattern leaving only the pit forming portion and the groove forming portion in accordance with a pre-set pattern.

The Ti film was etched using the left portion of the photoresist as a mask. The portion of the Ti film in register with the pit forming portion and the groove forming portion was formed to a convex shape to a disc molding metallic mold.

Specifically, etching is a chemical etching by the reactive gas plasma ions of $BCl_3$. The etching was carried out under conditions of the Ar to $BCl_3$ pressure ratio of 1:5, gas pressure of $2 \times 10^{-4}$ Torr, an ion beam incident angle of 75°, an acceleration voltage of 100 mA/300V and the magnet current of 2A.

On the disc substrate, thus produced, a magnetic recording layer was formed by a sputtering method using Ar as a sputtering gas. The magnetic recording layer was formed by layering an underlying layer for the magnetic layer, an intermediate layer of Cr with a film thickness of 0.5 mm, a magnetic layer and a protective layer for the magnetic layer in this order. A lubricating layer was further formed on the magnetic recording layer to complete the magnetic disc.

Specifically, the underlying layer of Cr was formed to a thickness of 10 nm with a film-forming rate of 2 nm/sec under a sputtering pressure of 0.1 Pa. The magnetic layer of $Co_{64}Pt_{20}Cr_{16}$ was then formed to a thickness of 24 nm with a film-forming rate of 2 nm/sec under a sputtering pressure of 0.1 Pa. The protective layer of C was then formed to a thickness of 13 nm with a film-forming rate of 0.5 nm/sec under a sputtering pressure of 0.5 Pa. The lubricating layer of FomblinZ-Dol was then formed to a thickness of approximately 2 nm by the dipping method.

The magnetic properties of the magnetic recording layer of the magnetic disc, manufactured as described above, were measured using a vibration sample type magnetometer (VSM). It was found that the residual magnetization thickness Mr.t=9 mA, coercivity Hc=167 kA/m and the coercivity rectangular ratio S*=0.8.

In a magnetic disc of the present Example 1, a step difference $t_0$ between a groove 102 and a land 101 was 200 nm, the width $t_{101}$ of the upper surface of the land 101 was 3.77 µm, the width $t_{103}$ of an inclined surface 103 on the boundary between the land 101 and the groove 102 was 0.3 µm and the width $t_{102}$ of the bottom surface of the groove 102 was 0.9 µm. At this time, the width Lw of the land 101 was Lw=$t_{101}+t_{103}$=3.80 µm, while the width Gw of the groove 102 was Gw=$t_{102}+t_{103}$=1.00 µm, with the ratio therebetween Lw/Gw being 3.80.

The numerical values specifying the shape of the groove 102 or the land 101 were obtained by measuring the shape of the groove 102 or the land 103 using an atomic force microscope (AFM).

Comparative Example 2

An Ir film was first formed on a substrate by a sputtering method employing Ar as a sputtering gas.

Specifically, the vacuum, sputtering pressure, power and the film forming speed were set to $5 \times 10^{-5}$ Pa, 0.2 Pa, 800 W and 10 µm/3000 s, respectively.

A photoresist was then coated on the Ir film and ground to a mirror surface.

The photoresist was exposed to light and developed for forming a resist pattern leaving only the pit forming portion and the groove forming portion in accordance with a pre-set pattern.

The Ir film was etched using the left portion of the photoresist as a mask. The portion of the Ir film in the register with the pit forming portion and the groove forming portion was formed to a convex shape to give a disc molding metallic mold.

Specifically, etching is physical etching by bombarding ions for cutting a groove. It was carried out under conditions of an Ar pressure of $2 \times 10^{-4}$ Torr, an ion beam incident angle of 75°, an acceleration voltage of 100 mA/300V and a magnet current of 2A.

Using the disc molding metallic mold, plastics were injection molded to from a disc substrate.

On the disc substrate, thus produced, a magnetic recording layer was formed in the same way as in the above Example. On the magnetic recording layer was further formed a lubricating layer to complete a magnetic disc.

In a magnetic disc of the present Example 1, a step difference $t_{10}$ between the groove 102 and the land 101 was 200 nm, the width $t_{101}$ of the upper surface of the land 101 was 3.38 µm, the width $t_{103}$ of the inclined surface on the boundary between the land 101 and the groove 102 was 0.56 µm and the width $t_{102}$ of the bottom surface of the groove 102 was 0.30 µm. At this time, the width Lw of the land 101 was Lw=$t_{101}+t_{103}$=3.94 µm, while the width Gw of the groove 102 was Gw=$t_{102}+t_{103}$=0.86 µm, with the ratio therebetween Lw/Gw being 4.58.

Evaluation of Off-track Characteristics

For the magnetic discs, manufactured as described above, recording/reproducing was actually carried out for measuring the off-track characteristics thereof.

For recording/reproduction, a compound magnetic head, combined from an inductive type magnetic head operating as a recording magnetic head and a magneto-resistance type magnetic head, operating as a playback magnetic head, was used. The recording head with a track width of 4.4 µm and a magnetic gap separation of 0.5 µm was used as the inductive type magnetic head, while a playback magnetic head with a track width of 3.6 µm and the separation of the magnetic shield holding a magneto-resistance device of 0.36 µm was used as magneto-resistance type magnetic head.

For assuring abutment of the compound magnetic head relative to the magnetic disc, a so-called 50% nano-slider was assembled into the magnetic head. The length and the width of the slider were 2.0 mm and 1.6 mm, respectively. Recording/reproduction was carried out by rotating the magnetic disc at a linear velocity of 7.36 m/sec. The amount of float of the compound magnetic head at this time was approximately 60 nm.

Figure 9:
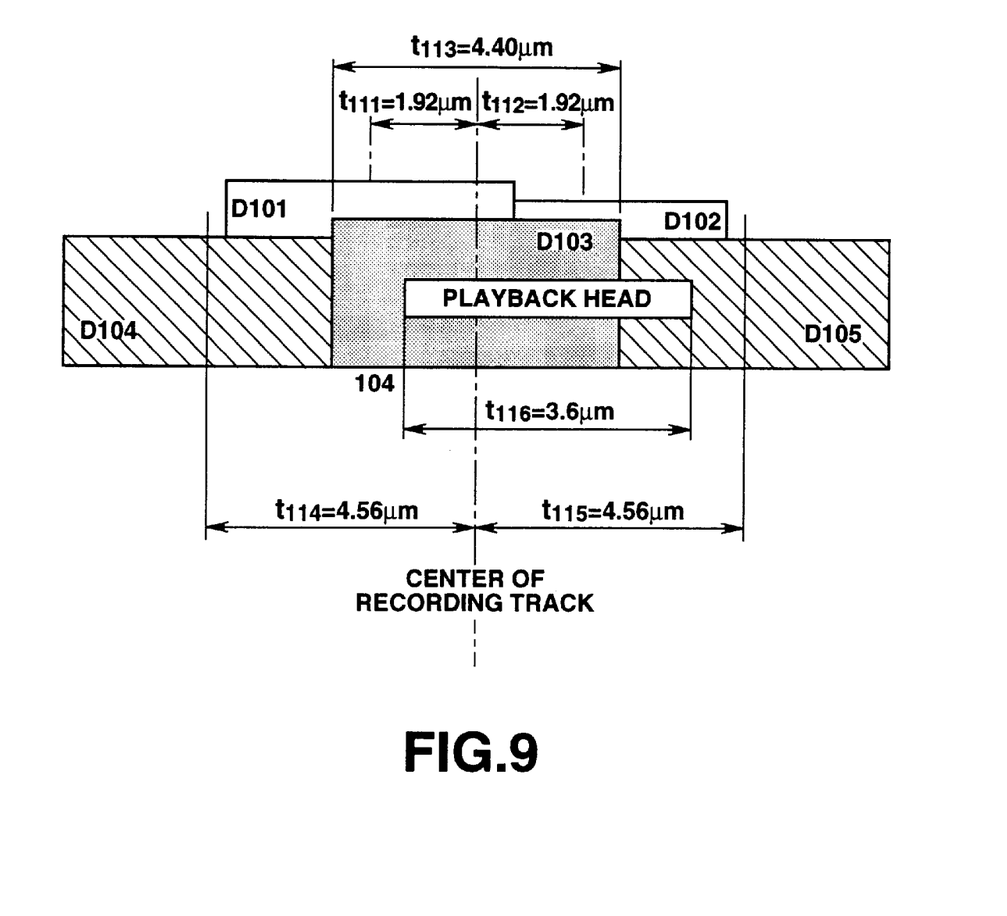
FIG. 9 is a schematic view showing a recording pattern at the time of measurement of the bit error rate.

The off-track characteristics were measured by writing data D101 to D105 on the magnetic disc using a recording magnetic head and reproducing the data D103 using the playback magnetic head 104.

First, using a recording magnetic head, virtual data D101, D102 were written on two (left and right) tracks, as indicated by $t_{111}$, $t_{112}$ in FIG. 9, deviated 1.5 µm each from a track under consideration in measuring the off-track characteristics, termed herein a recording track.

Then, data for detection D103 was written on the recording track, using a recording magnetic head. The width $t_{113}$ of a portion of the recording track, on which the data was written, corresponds to the track width T of the recording magnetic head, and is equal to 4.4 μm. The data length of the data D103 written in the recording track was 8528 bytes.

The recording magnetic head was then deviated from the center of the recording track a distance equal to 95% of the width of the track pitch Tp and data D104, D105 were overwritten on the neighboring two tracks (left and right tracks). That is, the data D104 and D105 were overwritten on the two left and right tracks, separated 4.56 μm from the center of the recording track, as indicated at $t_{114}$ and $t_{115}$ in FIG. 9, using the recording magnetic head.

The data written as described above were repeatedly read out by the playback recording head with a track width $t_{116}$ of 3.6 μm, as the head was deviated little by little from the center of the recording track. The reproduced track and the original recording data were compared to each other for measuring the bit (error rate, the reference of which was set to $10^{-7}$. That is, the maximum off-track amount satisfying the bit error rate of $10^{-7}$ was used as the reference for evaluation.

Figure 10:
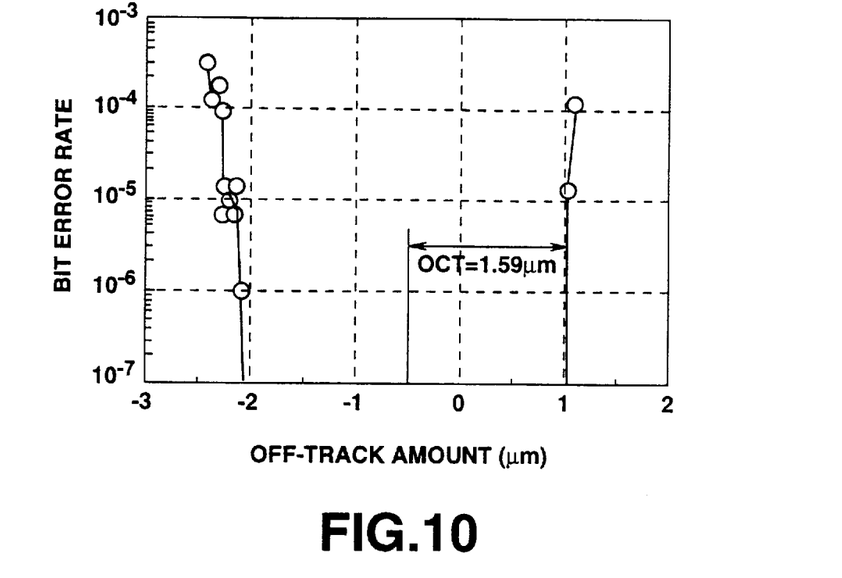
FIG. 10 is a graph showing the results of the measurement of the off-track amount of the playback magnetic head and the bit error rate.
Figure 11:
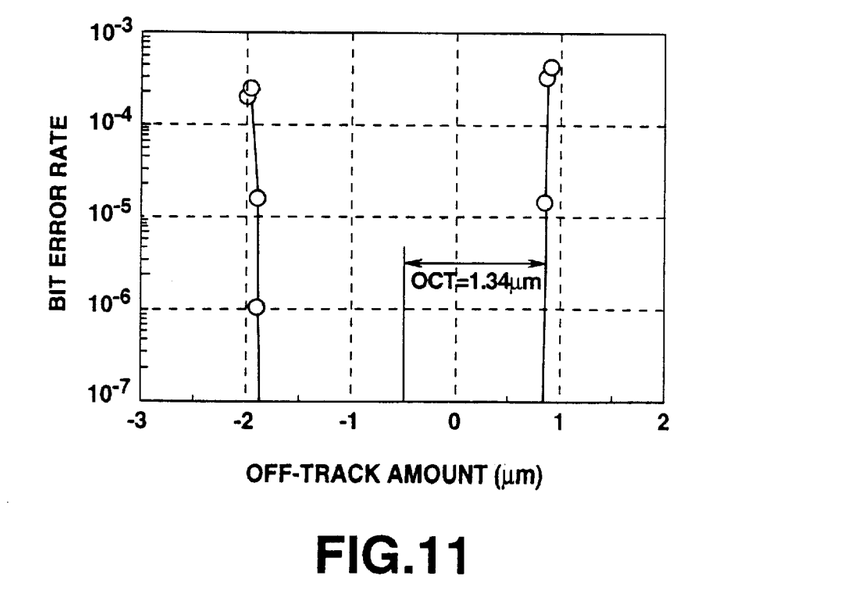
FIG. 11 is a graph showing the results of the measurement of the amount of off-track of the playback magnetic head and the bit error rate.

FIGS. 10 and 11 show the results of measurement of the amounts of off-track of the magnetic disc of the Comparative Example 2.

Figure 12:
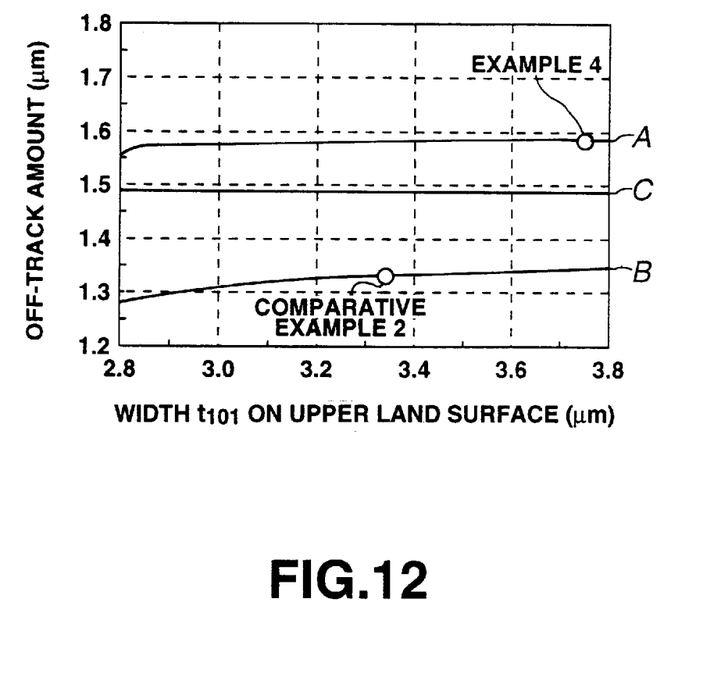
FIG. 12 is a graph showing the relation between the width $t_{101}$ of the upper land surface and the maximum amount of off-track.

FIG. 12 shows a theoretical curve of the amount of maximum off-track with respect to the width $t_{101}$ of the upper surface of the land 101. In this Figure, solid lines A and B are theoretical curves for the magnetic discs produced using the disc molding metallic molds of Example 4 and Comparative Example 2, respectively, while a solid line C s a theoretical curve for a magnetic disc having a flat surface.

With the magnetic disc of Comparative Example 2, the width $t_{101}$ of the upper surface of the land was 3.38 μm, with the maximum amount of off-track being 1.34 μm. This result substantially coincides with the theoretical curve of FIG. 12. It is seen from FIG. 12 that the magnetic disc of the Comparative Example 2 is significantly smaller in the amount of maximum off-track than the magnetic disc with a flat surface and worsened in off-track characteristics.

On the other hand, with the magnetic disc of Example 4, the width $t_{101}$ of the upper surface of the land was 3.77 μm, with the maximum amount of off-track being 1.59 μm. This result substantially coincides with the theoretical curve of FIG. 12. It is seen from FIG. 12 that the magnetic disc of the Example 4 is significantly larger in the amount of maximum off-track than the magnetic disc with a flat surface and superior in off-track characteristics.

The results of the Comparative Example 2 and the Example 4 are substantially coincident with the theoretical curve of FIG. 12, such that it may be surmised that similar experiments with different values of the width $t_{101}$ of the upper land surface will give results approximate to the theoretical curve.

As may be seen from FIG. 12, the magnetic disc fabricated using the disc-molding metal mold prepared by RIE with a Ti film has off-track characteristics superior to those of the magnetic disc having a flat surface.

What is claimed is:

1. A magnetic recording medium having irregular formations corresponding to servo signals and grooves extending along recording tracks, characterized in that
   the ratio Lw/Gw, where Lw and Gw denote the width of a land as a protuberant portion between neighboring grooves and the width of the groove, respectively, is not less than 2.0.

2. The magnetic recording medium as claimed in claim 1 wherein, the track pitch Tp and the width t of an inclined surface on a boundary between said land and the groove have the relationship, $$Lw/Gw \leq (\tfrac{1}{5} \times Tp + t)/(\tfrac{1}{5} \times Tp - t).$$

3. The magnetic recording medium as claimed in claim 1 wherein Lw/Gw is not more than 7.26.

4. The magnetic recording medium as claimed in claim 1 wherein the step difference between said groove and the land is not less than 100 nm.

5. The magnetic recording medium as claimed in claim 1 wherein an angle which the inclined surface on the boundary between said land and the groove makes with said land is not less than 90° and not more than 105°.

6. A magnetic recording/reproducing apparatus having a recording magnetic head for magnetic recording on a magnetic recording medium having grooves formed along recording tracks, characterized in that
   the track width T of the recording magnetic head is not less than the width Lw of the land representing a protuberant portion between neighboring grooves and not more than the sum of the track pitch Tp and the groove width Gw.

7. The magnetic recording/reproducing apparatus as claimed in claim 6 wherein, the width Lw of the land, width Gw of the groove, track pitch Tp and the servo error margin Em during magnetic recording, the track width T of the recording magnetic head is given by:

$$Lm + Em \times 2 \leq T \leq Tp + Gw - Em \times 2.$$

8. A method for manufacturing a disc-molding metallic mold formed by a substrate and a Ti metallic film formed thereon, comprising the steps of: depositing a Ti metallic material on said substrate to form a Ti metallic film;
   applying a photoresist on said Ti metallic film;
   exposing said photoresist to light and thereby developing said photoresist, leaving only a bit-forming portion and/or a groove-forming portion in accordance with a pre-set pattern; and
   etching said Ti metallic film by reactive ion etching with $BCl_3$ gas, using any photoresist remaining after said exposing step as a mask, whereby portions of said Ti metallic film are formed in register with said bit-forming portion and/or the groove-forming portion as protuberant portions to form the disc-molding metallic mold.

* * * * *